Figure 1:
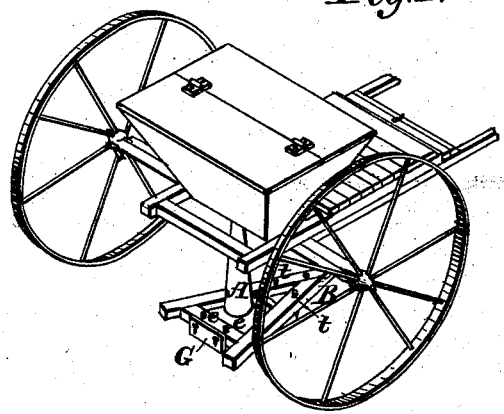

L. WOODRUFF.
Grain Drill.

No. 47,593.

Patented May 2, 1865.

Witnesses.
Andrew Bell
Edwin B. Gilly

Inventor.
Levi Woodruff

UNITED STATES PATENT OFFICE.

LUM WOODRUFF, OF ANN ARBOR, MICHIGAN.

IMPROVEMENT IN SEED-PLANTERS.

Specification forming part of Letters Patent No. 47,593, dated May 2, 1865.

*To all whom it may concern:*

Be it known that I, LUM WOODRUFF, of Ann Arbor, in the county of Washtenaw, in the State of Michigan, have invented a new and useful Improvement on Seed-Planters; and I do hereby declare that the following is a true and exact description thereof, reference being had to the accompanying drawings, and to the letters of reference marked thereon.

The object of this improvement is, first, to effectually remove or crush all stone or hard lumps of earth or other impediments from before the drill, so that they will in no way interfere with the proper action of the machine; second, to place the seed in the ground scattered uniformly and in definite limits; third, to gage the depth of covering as may be desired; fourth, the combination and adjustment of the various parts of the machine so that ordinary inequalities of surface will not interfere with its perfect practical working.

To enable others skilled in the art to make and use my invention, I will proceed to describe its construction and operation.

The arrangement for dropping a given quantity of seed may be the ordinary shuttle of most corn and bean planters modified to suit this machine. For the purpose of scattering the seed I place centrally underneath the dropping-aperture or the tube leading from it the point of a cone, the base of which is only a few inches from the surface of the ground to be worked. The cone should be suspended at some point as near as possible to its apex, and its base left with some freedom of motion, so that while the planter is passing over uneven ground the perpendicular position of the cone may not be essentially disturbed. In order more fully to insure the uniform division of the seed, several partitions are placed extending longitudinally from its base to near its apex, and inclosing the whole is an outer covering placed a suitable distance from the cone itself. As the corn, beans, or other seed falls from the dropping-shuttle on the apex of the cone the grains will be separated and will be further distributed in the channels between the partitions above described, by which they will reach the ground.

By varying the base of the cone it is manifest the seed may be placed in limits of any size or form desired.

By means of ordinary gearing the frequency of dropping in the rows made by the machine may be increased or diminished at pleasure. Several rows may also be worked at once by the same machine and at any distance from each other.

In order to thoroughly prepare the ground for the action of the seed-drill and effectually remove all impediments from before it, I place both the tooth marking the furrow in which the seed is dropped and the arrangement for covering behind and within a triangular-shaped drag. To form this drag, several teeth are placed in each of the side pieces thereof, the teeth on each side being set in a right line with the forward tooth in the apex of the drag. The width of the drag is merely sufficient to clear a path wide enough for the action of the covering-teeth placed behind it. On the central line of the drag, and at a convenient distance from the apex, I place a tooth of suitable form for marking a slight furrow, and directly behind this is suspended the dropping conical tube. Lastly follow the teeth for covering, which may be of mold-board shape, turning the earth toward each other, and thus covering the seed as they pass each side of the furrow. On the back of these teeth is placed the adjustable gage, (marked C in the annexed drawing,) the effect of which is to leave the ridge in which the seed is covered smooth, compact, and even, and also being movable to gage the depth of the covering.

The following details will exhibit the connection of the parts above described, as shown in the annexed drawings.

Figure 2:
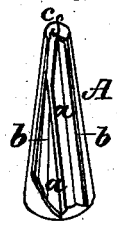

Figure 1 shows the relation of the parts. A is a conical tube, a perspective of which is shown in Fig. 2. B B is the drag. $ff$ are common drag-teeth. $d$ is a small plow or broad cultivator-tooth, making a furrow to receive the seed. $e\ e$ are similar teeth for covering the seed. C is the adjustable gage-bar, which has slots in each end, through which screws pass, and by means of which it is fastened behind the teeth $e\ e$. $h$ is a rod for connecting the drag to the frame of the planter. It is fastened in any of the ordinary ways, upon which I have no claim.

Fig. 2 shows a perspective of the cone. A is the outer covering, which may be made of tin or other suitable material. $a\ a$ is the cone, which is concentric with the outer covering, and may be made of wood. $b\ b\ b$ are strips of tin or other material for dividing the space between the cone and the covering into narrow passages, along which the seeds are to pass. $c$ is the hook by which the cone may be attached to the seed-box.

I do not claim the broad tooth $d$, which marks the furrow to receive the seed, nor the teeth $e\ e$ for covering the seed, nor any particular form of teeth for these purposes. Neither do I wish to claim the combination of drag or cultivator teeth with seed-planting machines, except when they are placed in a drag of triangular form, as above specified, and so as to work on each side and in front of the furrow which receives the seed—that is, a single tooth forming the apex of the drag with several others back of it.

What I claim as my invention, and desire to secure by Letters Patent, is—

1. The conical dropping-tube A, consisting of the cone $a\ a$, with the partitions $b\ b$, separating the space between the cone $a\ a$ and its concentric outer covering, A, into several grooves or channels for the more effectual scattering of the seed, the whole being constructed and arranged substantially in the manner and for the purpose described in the above specification.

2. The device of a conical or pyramidal point placed underneath the dropping-aperture of seed-planting machines for the purpose of distributing or scattering the seed as it falls over the base of the cone or pyramid to the ground.

3. The arrangement of the small triangular drag B B with the teeth $t\ t$, when placed on each side and in front of the furrow-tooth $d$, and the covering-teeth $e\ e$, substantially in the manner and for the purposes set forth in the above specification.

4. The adjustable cross-bar or gage $c$, when movably attached behind the teeth $e\ e$, so that it may be raised or lowered to control the depth of working of the teeth $e\ e$, as described in the specification.

LUM WOODRUFF.

Witnesses:
JOHN N. GOTT,
D. HENING.